United States Patent [19]

Nakatsuma

[11] Patent Number: 5,335,085
[45] Date of Patent: Aug. 2, 1994

[54] FACSIMILE APPARATUS

[75] Inventor: Takuji Nakatsuma, Urayasu, Japan

[73] Assignee: Canon Kabushiki Kaisha, Tokyo, Japan

[21] Appl. No.: 937,113

[22] Filed: Aug. 31, 1992

[30] Foreign Application Priority Data

Sep. 5, 1991 [JP] Japan .................. 3-254700

[51] Int. Cl.$^5$ .......... H04N 1/00; H04N 1/32
[52] U.S. Cl. ................. 358/404; 358/405; 358/437
[58] Field of Search .......... 358/400, 404, 405, 434, 358/437, 444

[56] References Cited

U.S. PATENT DOCUMENTS

| | | |
|---|---|---|
| 4,772,955 | 9/1988 | Kurahayashi et al. |
| 4,811,385 | 3/1989 | Watanabe |
| 4,845,569 | 7/1989 | Kurahayashi et al. |
| 4,894,843 | 1/1990 | Yoshida et al. |
| 5,057,938 | 10/1991 | Edamura ................. 358/406 |
| 5,119,210 | 6/1992 | Bara ..................... 358/405 |

FOREIGN PATENT DOCUMENTS 0193410 9/1986 European Pat. Off.

OTHER PUBLICATIONS

Pat. Abs. Jp., vol. 12, No. 342, Sep. 14, 1988 (JP-A-63 102 539).
Pat. Abs. Jp., vol. 11, No. 110, Apr. 7, 1987 (JP-A-61 258 565).

Primary Examiner—Vit W. Miska
Attorney, Agent, or Firm—Fitzpatrick, Cella, Harper & Scinto

[57] ABSTRACT

In memory storage transmission, if image transmission has been interrupted because of an error, the cause of the error is determined. Error image data whose retransmission has a possibility of success is preserved in an image memory, and error image data whose retransmission has no possibility of success is erased from the image memory. If error image data is preserved in the image memory, and storage of new image data in the image memory is instructed, error image data preserved in the image memory is erased in accordance with the remaining amount of memory capacity of the image memory. It is thereby possible to preserve appropriate error image data in the image memory without reducing the efficiency of the memory.

19 Claims, 8 Drawing Sheets

| RECORDS NO. | USED FLAG | KIND OF SERVICE | NUMBER OF COMMUNICATION PARTNER | DATA AND TIME | TRANSMISSION/ RECEPTION | ERROR IMAGE | AMOUNT OF DATA |
|---|---|---|---|---|---|---|---|
| 0 | 1 | TRANSMISSION | 562111 | AUG. 1 10:00 | TRANSMISSION | PRESENT | 32 kbyte |
| 1 | 1 | RECEPTION | 333333 | AUG. 1 17:46 | RECEPTION | ABSENT | 0 |
| 2 | 1 | CONFIDENTIAL | 222222 | AUG. 2 08:13 | TRANSMISSION | PRESENT | 64 kbyte |
| 40 | 0 | 0 | 000000 | 000000000 | 0 | 0 | 0 |

FIG.3

| NAME OF SYSTEM SWITCH | SET RANGE | | SET VALUE |
|---|---|---|---|
| ERASURE-IN-TRANSMISSION MODE | ERASE | NOT ERASE | ERASE |
| COMMUNICATION-RESULT ERASURE MODE | ERASE | NOT ERASE | NOT ERASE |
| REPORT OUTPUT MODE | OFF | ON | ON |
| IMAGE OUTPUT MODE | OFF | ON | ON |
| ERASURE-IN-STORAGE MODE | YES | NO | YES |
| ERASURE SEQUENCE | LARGEST | OLDEST | OLDEST |
| ERASURE OF IMAGE WHEN COMMUNICATION RESULT IS ERASED | ERASE | NOT ERASE | ERASE |
| PASS WORD | 0000 | 9999 | 1234 |

FIG.4

| CAUSE OF ERROR | ERROR CODE | DETERMINATION OF RETRANSMISSION |
|---|---|---|
| ABSENCE OF NUMBER OF COMMUNICATION | 01 | NO RETRANSMISSION |
| COMMUNICATION PARTNER BUSY | 11 | RETRANSMISSION |
| REFUSAL OF COMMUNICATION | 15 | NO RETRANSMISSION |
| COMMUNICATION PARTNER'S TERMINAL IN TROUBLE | 21 | RETRANSMISSION |
| NO FAX FUNCTION IN COMMUNICATION PARTNER'S TERMINAL | 30 | NO RETRANSMISSION |

FACSIMILE APPARATUS

BACKGROUND OF THE INVENTION

1. Field of the Invention

This invention relates to a facsimile apparatus which includes an image memory for storing image data.

2. Description of the Related Art

In a conventional facsimile apparatus which stores image data read from an original in a memory and transmits the stored image data, if some kind of transmission error is produced during image transmission, error image data stored in the memory remains there and is preserved until the data is erased after the completion of retransmission instructed by the operator, or until the operator instructs the apparatus to erase the error image data. U.S. Pat. Nos. 4,772,955 (issued Sep. 20, 1988) and 4,845,569 (issued Jul. 4, 1989) relate to facsimile apparatuses which perform such memory transmission.

Accordingly, in the above-described conventional facsimile apparatuses, the remaining capacity of the image memory is reduced for as long as the error image data are preserved. As a result, data of a new original cannot be stored, and therefore its transmission cannot be performed.

In the above-described conventional approach, error image data are unconditionally preserved if an error is produced during transmission. Hence, error image data is always preserved even in the case of an error leaving no possibility of successful retransmission, causing a reduction in the efficiency of the memory.

On the other hand, if error image data is erased immediately after image transmission is interrupted because of an error in order to increase the efficiency of the memory, the error image data must be read again in order to retransmit the error image data.

SUMMARY OF THE INVENTION

The present invention has been made in consideration of the above-described problems in the prior art.

It is an object of the present invention to provide an improved facsimile apparatus.

It is another object of the present invention to provide a facsimile apparatus which can preserve error image data without reducing the effciency of a memory when a transmission error is produced in memory storage transmission.

These and other objects, advantages and features of the present invention will become more apparent from the following detailed description of the preferred embodiment taken in connection with the accompanying drawings.

DETAILED DESCRIPTION OF THE PREFERRED EMBODIMENT

A preferred embodiment of the present invention will now be explained in detail with reference to the drawings.

Figure 1:
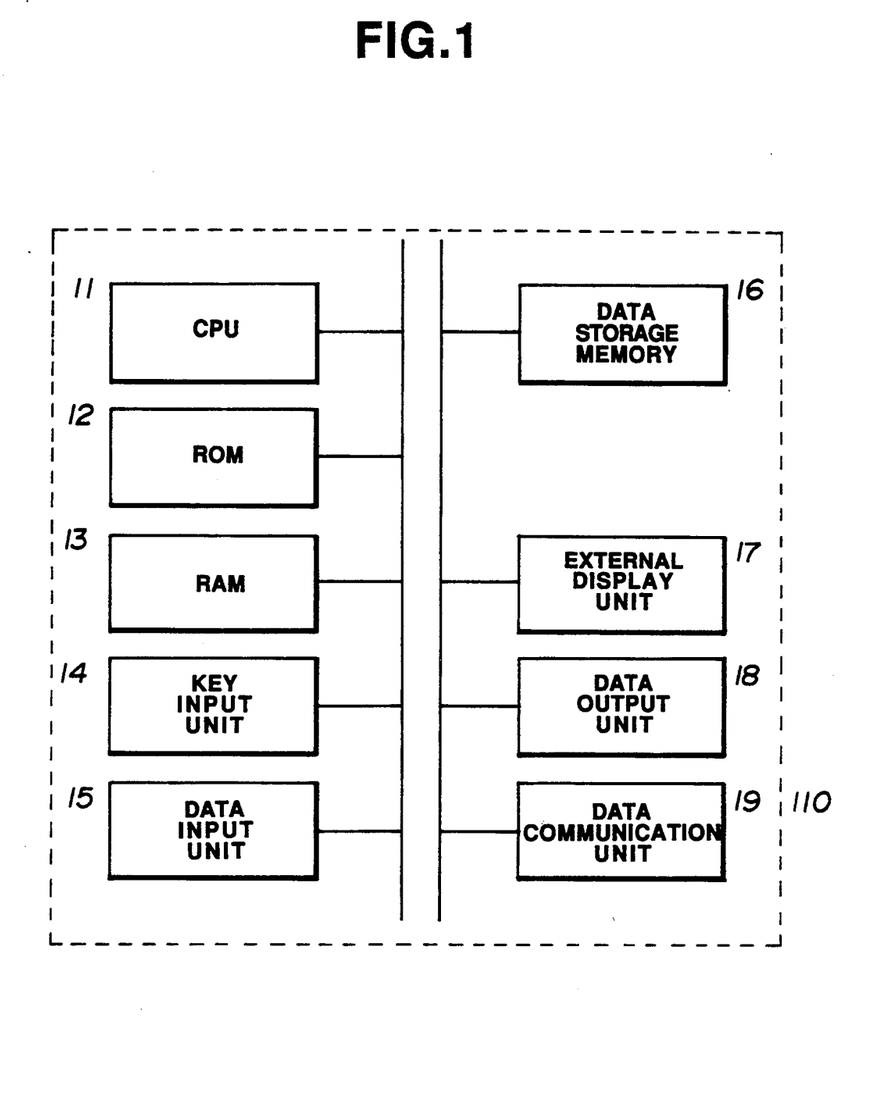
FIG. 1 is a block diagram showing the configuration of a facsimile apparatus according to an embodiment of the present invention.

FIG. 1 is a block diagram showing the configuration of a facsimile apparatus according to the embodiment.

In FIG. 1, a CPU (central processing unit) 11 controls the entire apparatus in accordance with control programs stored in a ROM (read-only memory) 12. The ROM 12 stores various kinds of fixed data in addition to the above-described control programs. A RAM (random access memory) 13 temporarily stores data used by the CPU 11, and also stores a communication-result table, a system-switch table (to be described later) and the like.

A key input unit 14 provides operation keys with which the operator performs various kinds of operations. A data input unit 15 reads image data on the surface of an original, and converts the read image into digital signals.

A data storage memory 16 is a memory unit, comprising hard disks or the like, for storing image data received from the outside or read from the data input unit 15. An external display unit 17, comprising an LCD (liquid-crystal display) or the like, displays characters, pictures or the like for the operator, and receives instructions from the operator.

A data output unit 18 prints received originals, reports and the like. A data communication unit 19 performs data communication with other communication apparatus via a telephone line 110.

Figure 2:
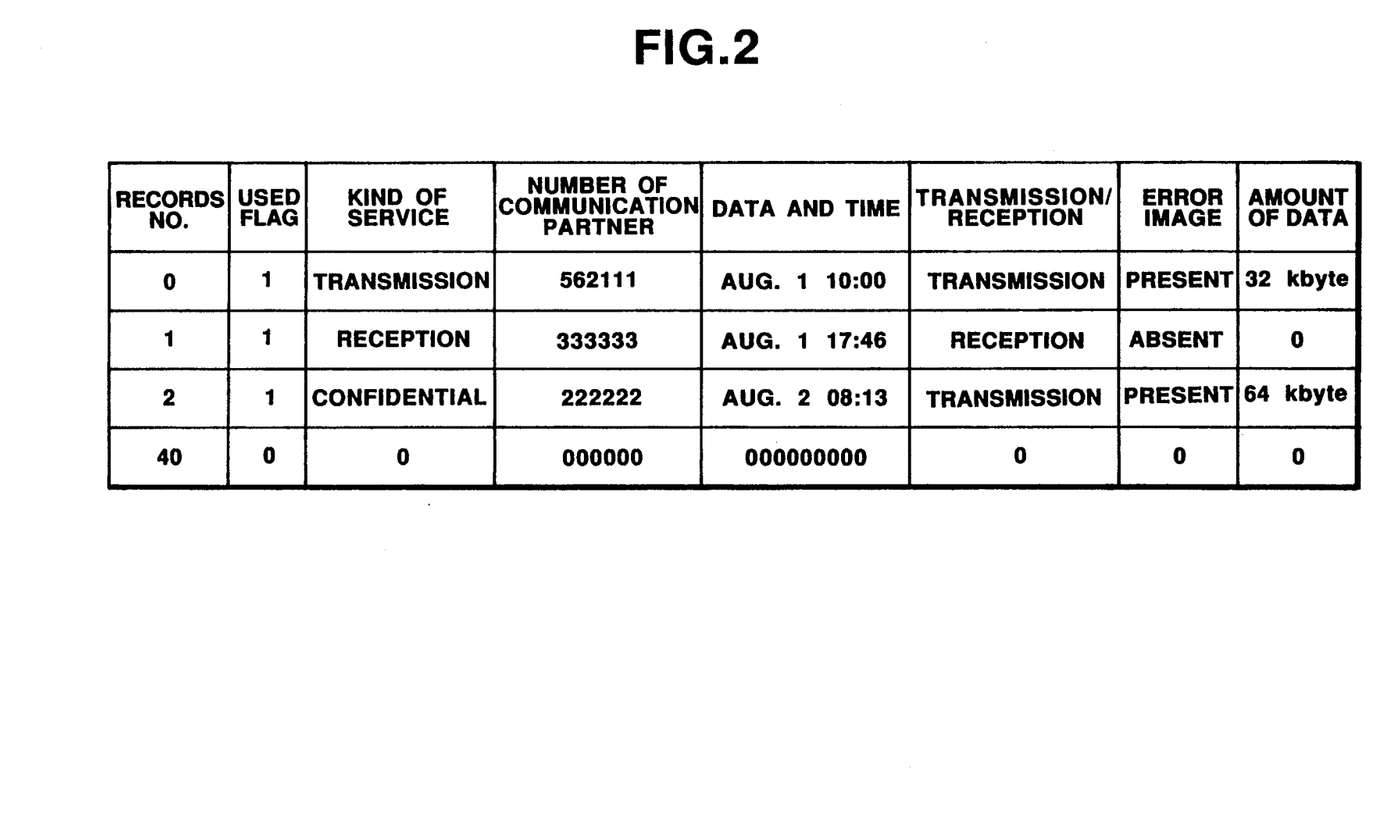
FIG. 2 is diagram illustrating a communication-result table in the embodiment.

FIG. 2 is a diagram illustrating a communication-result table which preserves communication results in the present embodiment.

The communication-result table is stored in the RAM 13, and the contents of the table are registered and updated by the CPU 11. The numbers of communication partners, dates and times when communication operations are started, the kinds of transmission/reception, the presence/absence of presered error image data, the amounts of error image data, and the like can be registered in the communication-result table.

Figure 3:
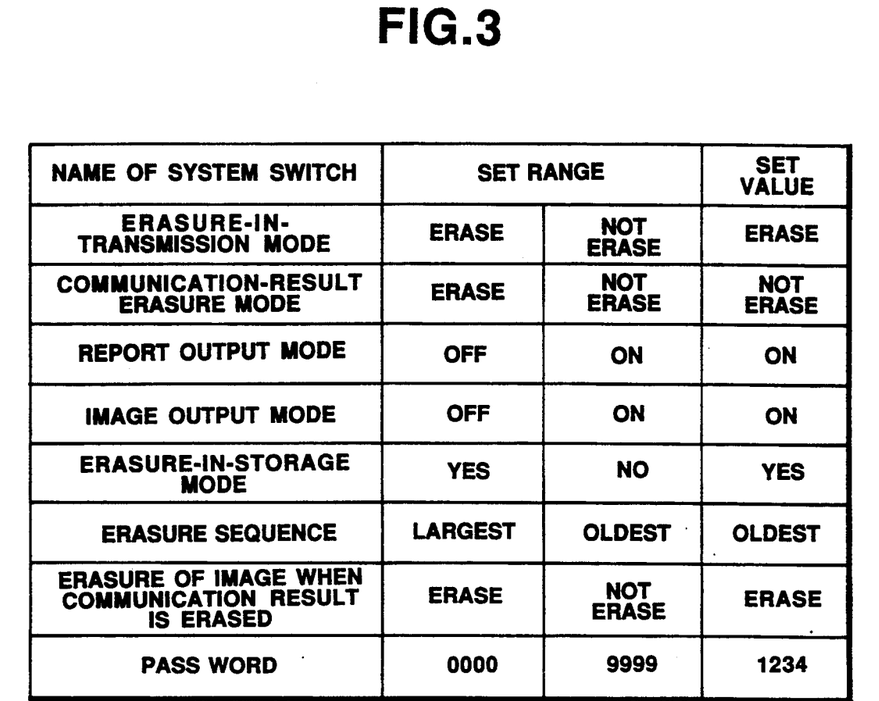
FIG. 3 is a diagram illustrating a system-switch table in the embodiment.

FIG. 3 is a diagram illustrating a system-switch table in the present embodiment.

The system-switch table is stored in the RAM 13. For each processing mode, the CPU 11 determines the corresponding operation by referring to this table. The CPU 11 sets and changes the contents of the system-switch table in accordance with instructions from the key input unit 14 by the operator. That is, the table includes an area for storing ranges of set values (that is, the allowed possibilities) for respective system switches and current set values. A set value can be changed within the set range in accordance with an instruction of the operator.

Figure 4:
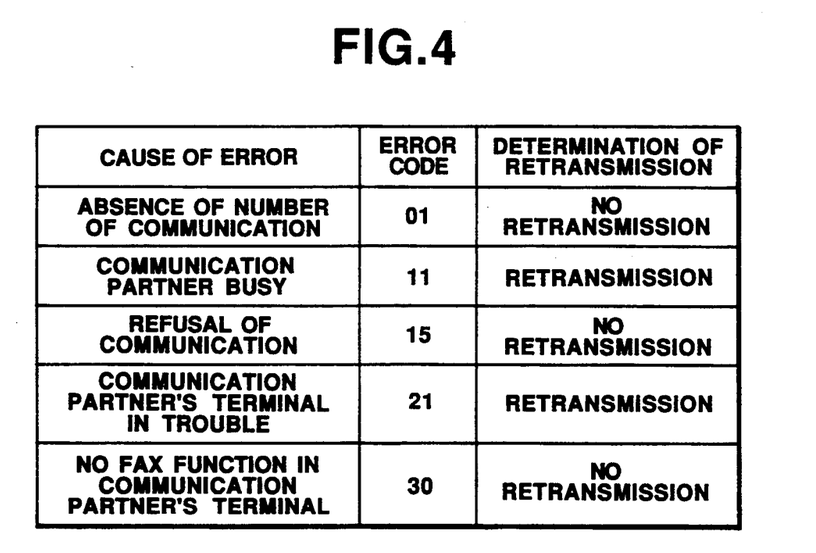
FIG. 4 is a diagram illustrating a code table for transmission errors in the embodiment.

FIG. 4 is a diagram illustrating a code table for transmission errors in the present embodiment.

Each error code is available to indicate the cause of an error when the CPU 11 asks the data communication unit 19 to perform communication, and the data communication unit 19 notifies the CPU 11 of the cause of error when the communication is interrupted because of the error and also whether retransmission should be tried.

Figure 5:
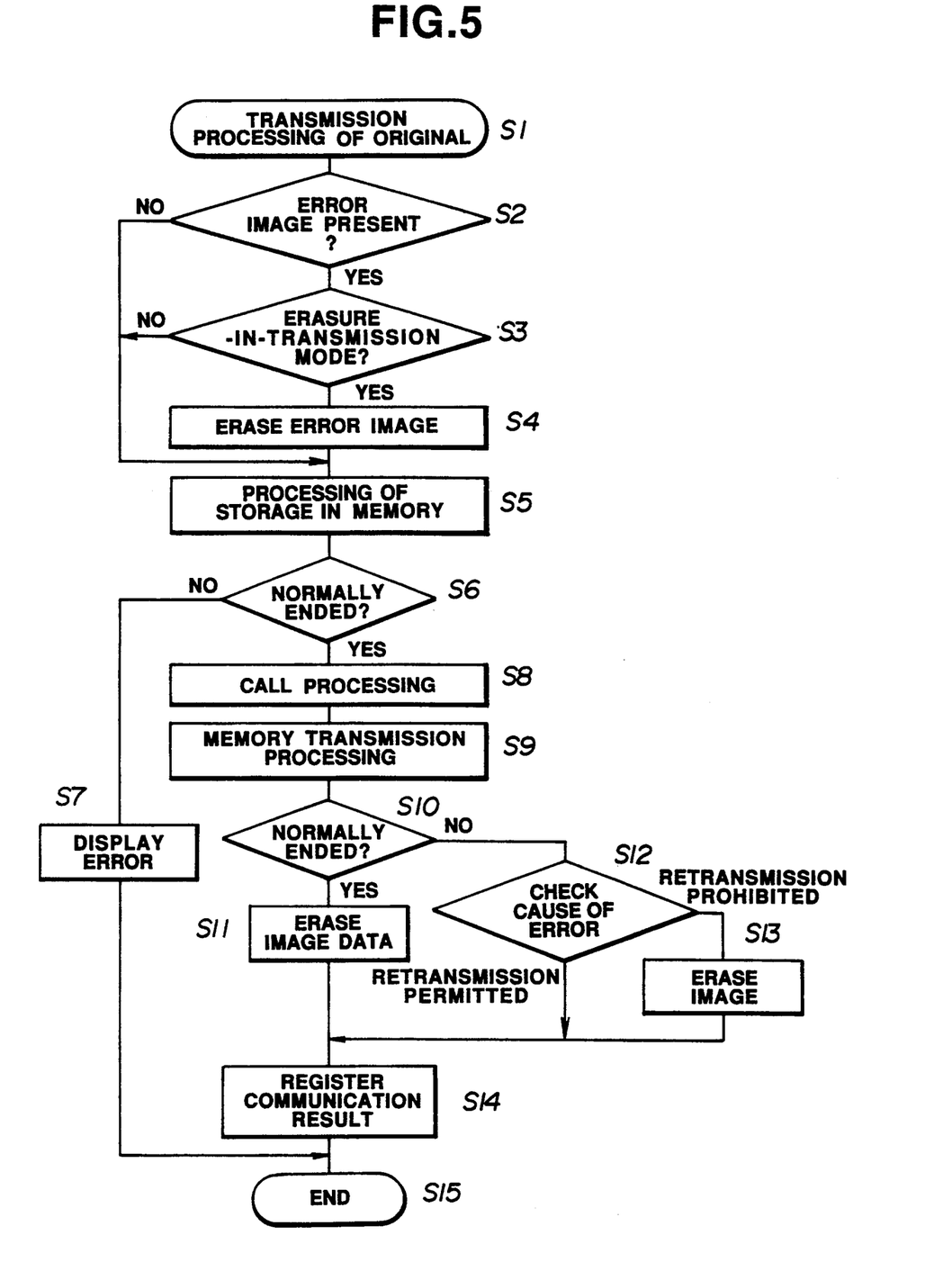
FIG. 5. is a flowchart showing the operation in image transmission processing in the embodiment.

FIG. 5 is a flowchart showing the operation in image transmission processing in the present embodiment.

When the operator instructs the apparatus to transmit an original from the key input unit 14 (step S1), the CPU 11 searches for error-image items in the above-described communication-result table, and checks for the presence of data of an error image (step S2). If the CPU 11 has determined that no error image is present, the process proceeds to processing after step S5.

If the CPU 11 has determined that an error image is present in step S2, the CPU 11 refers to the set value in the erasure-in-transmission mode within the system-switch table (step S3). If the set value does not call for erasing the error image data, processing after step S5 is performed.

If the error image data is to be erased in step S3, processing of erasing the error image data shown in FIG. 5 (to be described later) is performed (step S4). By thus performing processing of erasing the error image data, it is possible to increase the effective capacity of the memory which can be used in memory storage transmission.

Subsequently, the CPU 11 performs processing of storage in the memory (to be described later) shown in FIG. 6 (step S5). The CPU 11 then determines whether or not this processing of storage in the memory has normally ended (step S6). If the result of the determination is negative, an error is displayed on the external display unit 17 to notify the operator of the fact (step S7), and the processing is terminated (step S15).

If the result of the determination in step S6 is affirmative, a call is performed by the data communication unit 19 via the line 101 (step S8), and the image data stored in step S5 is transmitted (step S9). The data communication unit 19 notifies the CPU 11 of the result of the processing in steps S8 and S9, and the CPU 11 determines whether or not the transmission processing has normally ended (step S10).

If the result of the determination in step S10 is affirmative, the CPU 11 releases the memory block of the image data stored in step S5 and erases the image data (step S11). Subsequently, the CPU 11 registers the result of the communication, and the like in the communication-result table (step S14), and the processing is terminated (step S15).

If the result of the determination in step S10 is negative for some reason, the data communication unit 19 notifies the CPU 11 of the corresponding error code. The CPU analyzes the cause of the error from the error code by referring to the error-code table, and determines whether or not the generated error leaves a possibility of successful retransmission (step S12).

Conventionally, error image data have been unconditionally preserved when the communication has been interrupted in an abnormal state. In the present embodiment, however, the cause of the error is checked in step S12. If the CPU 11 determines that retransmission can be successfully performed, for example, when the communication partner's apparatus was properly accessed in the first transmission but there was no recording paper, the error image data are maintained in a preserved state. On the other hand, if the CPU 11 determines that there is no possibility of successful retransmission, for example, because the cause of the error was dialing the wrong number for the communication partner, the CPU 11 releases the memory block of the image data stored in the data storage memory 16 in step S5, and erases the image data (step S13).

By thus providing the function of checking the cause of error in step S12, unnnessary image data will not be preserved, and the image memory can be efficiently utilized. If retransmission is performed within a predetermined time interval (for example, two to three minutes) even if the first transmission is interrupted because of an error, and image data cannot be correctly transmitted after a predetermined number of times (for example, about three to five times) of attempted retransmission, the CPU 11 determines that the image transmission has not succeeded because of the error.

Subsequently, the CPU 11 registers the result of the communication including the item indicating the presence of error image data in the communication-result table (step S14), and the processing is terminated (step S15).

Figure 6:
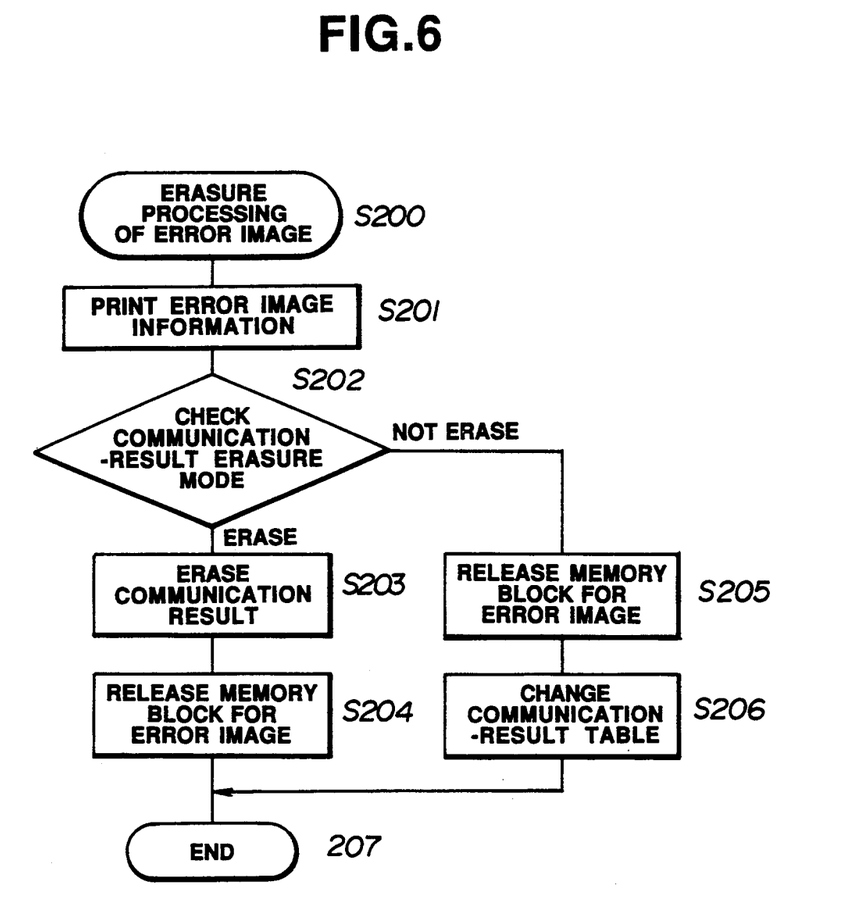
FIG. 6 is a flowchart showing processing of erasing an error image data in the embodiment.

FIG. 6 is a flowchart showing the processing of erasing the error image data in the above-described step S4.

When the processing of erasing the error image data is activated (step S200), first the processing of printing error image information shown in FIG. 7 (to be described later) is performed (step S201). Subsequently, set values registered for the communication-result erasure mode within the system-switch table are referred to (step S202) in order to determine whether the current mode is a mode for simultaneously erasing the communication result together with the error image data when the error image data is erased, or a mode for leaving the communication result even if the error image data is erased.

In the case of the mode for simultaneously erasing the communication result, the contents of the communication result corresponding to the error image data are erased from the communication-result table, and the used flag is set to "0", that is, a vacant state (step S203). Subsequently, by releasing the memory block of the error image data stored in the data storage memory 16, the error image data is erased (step S204), and the processing is terminated (step S207).

In the case of the mode for not simultaneously erasing the communication result in the above-described step S202, the memory block of the error image data is first released, and the error image data is erased (step S205). Subsequently, the item indicating the presence of an error image for the corresponding record number within the communication-result table is changed from "an error image is present" to "an error image is absent" (step S206), and the processing is terminated (step S207).

Figure 7:
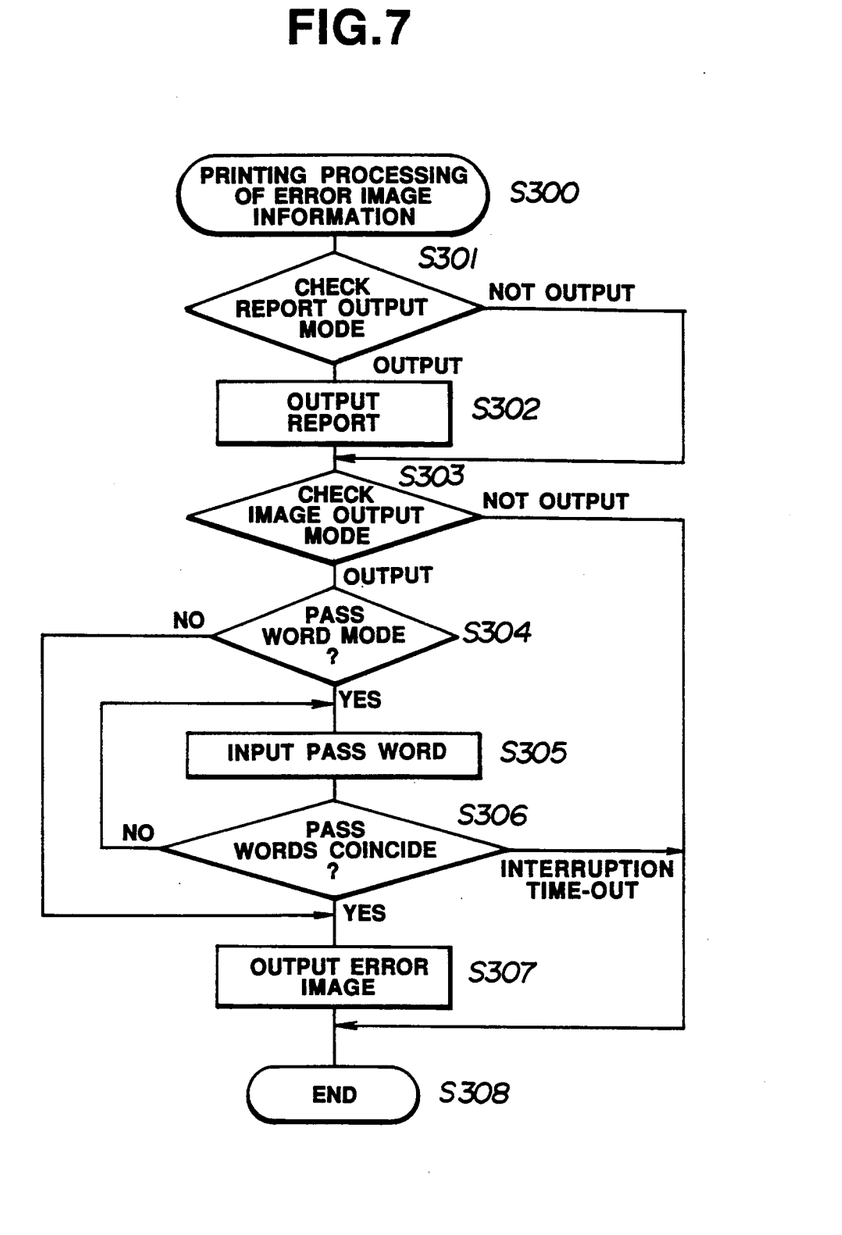
FIG. 7 is a flowchart showing processing of printing error image information in the embodiment.

FIG. 7 is a flowchart showing the processing of printing error image information in the above-described step S201.

When the processing of printing error image information is activated (step S300), the CPU 11 checks the report out-put mode when erasing error image data registered within the system-switch table (step S301).

If the report output mode is on, the data output unit 18 prints a message notifying the operator of the erasure of the error image data, such as "the error image data has been erased" or the like, and containing the contents registered in the communication-result table as a report (step S302).

If the report output mode of the system switch is off in step S301, or after the completion of processing of step S302, whether or not the image is to be printed is checked according to the image output mode registered in the system-switch table before erasing the error image data (step S303).

If the image output mode is off in step S303, the processing is terminated (step S308).

If the image output mode is on in step S303, by referring to the communication-result table, whether or not a password is requested for the image is checked according to the kind of the transmission service (step S304). For example, in the case of confidential transmission, a password is needed.

In the case of a service which does not require a password, the error image is immediately printed from the data output unit 18 (step S307), and the processing is terminated (step S308).

In the case of a service in which a password is needed for the image, the CPU 11 monitors input of the password by the operator (step S305).

When the password has been input, the input value is compared with the password registered in the system-switch table (step S306). If the two passwords do not coincide, the process returns to step S305, where reinput of a password is awaited.

If a password is not input for a certain time period in step S305, or if cancellation of image output is instructed when a password is input, the processing is terminated without outputting the error image (step S308).

If the input value of the password coincides with the value of the password registered in the system-switch table in step S306, the error image is printed from the data out-put unit 18 (step S307), and the processing is terminated (step S308).

Figure 8:
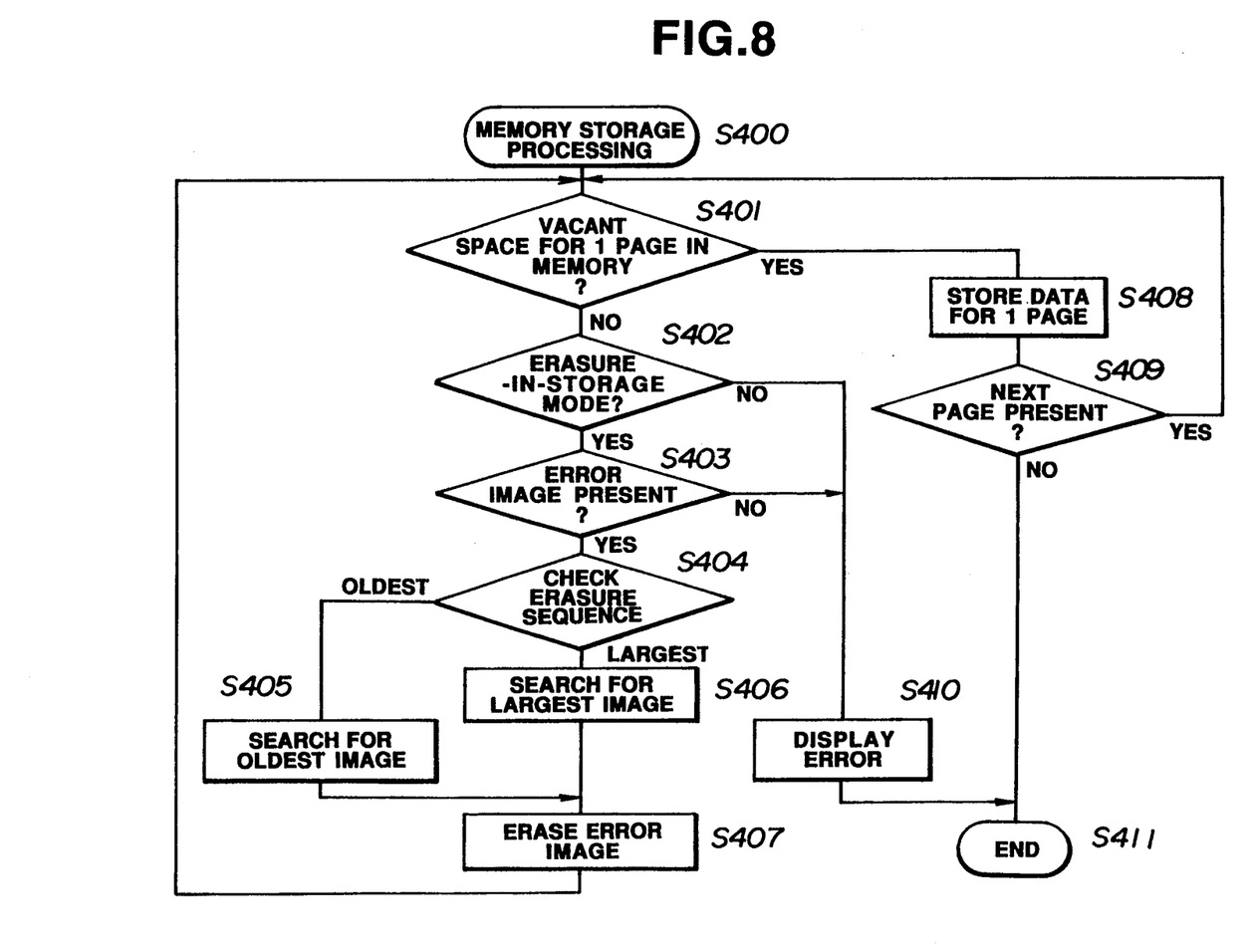
FIG. 8 is a flowchart showing processing of storage in the memory in the embodiment.

FIG. 8 is a flowchart showing the processing of storage in the memory in the above-described step S5.

If the processing of storage in the memory is activated (step S400), the CPU 11 first checks whether or not a vacant memory region for one page is present in the data storage memory 16 (step S401).

If a memory region for one page is not vacant, the erasure-in-storage mode registered in the system-switch table is referred to (step S402). If error image data can be erased, whether or not there is error image data stored within the memory 16 is checked according to the error-image item in the communication-result table (step S403).

If no error image data has been preserved, then no vacant area for storing the image data of the original can be created by erasing error image data. Hence, the processing of storage in the memory cannot be performed, and an error display is performed on the external display unit 17 in step S410, and the processing is terminated (step S411).

If error image data is identified as preserved in step S403, by referring to the erasure sequence within the system-switch table (step S404), the CPU 11 determines whether the oldest data is to be erased, or whether the error image data having the largest amount of data is to be erased if a plurality of error image data are stored.

In the mode of erasing the oldest data, the record having the oldest data including error image data is searched for from the communication-result table (step S405), the error image data of the searched record is erased (step S407), and the process returns to step S401.

In the mode of erasing the error image data having the largest amount of data in step S404, the record of error image data having the largest amount of data is searched for from the communication-result table (step S406), the error image data of the searched record is erased (step S407), and the process returns to step S401.

If a vacant memory region for one page is present in the data storage memory 16 in step S401, the original is read from the data input unit 15, and the read image data is stored in the data storage memory 16 (step S408).

After the completion of this processing, the CPU 11 checks whether or not an original to be subsequently stored is present (step S409). If the result of the check is affirmative, the process returns to step S401. If the result of the check is negative, the processing of storage in the memory is normally terminated (step S411).

Figure 9:
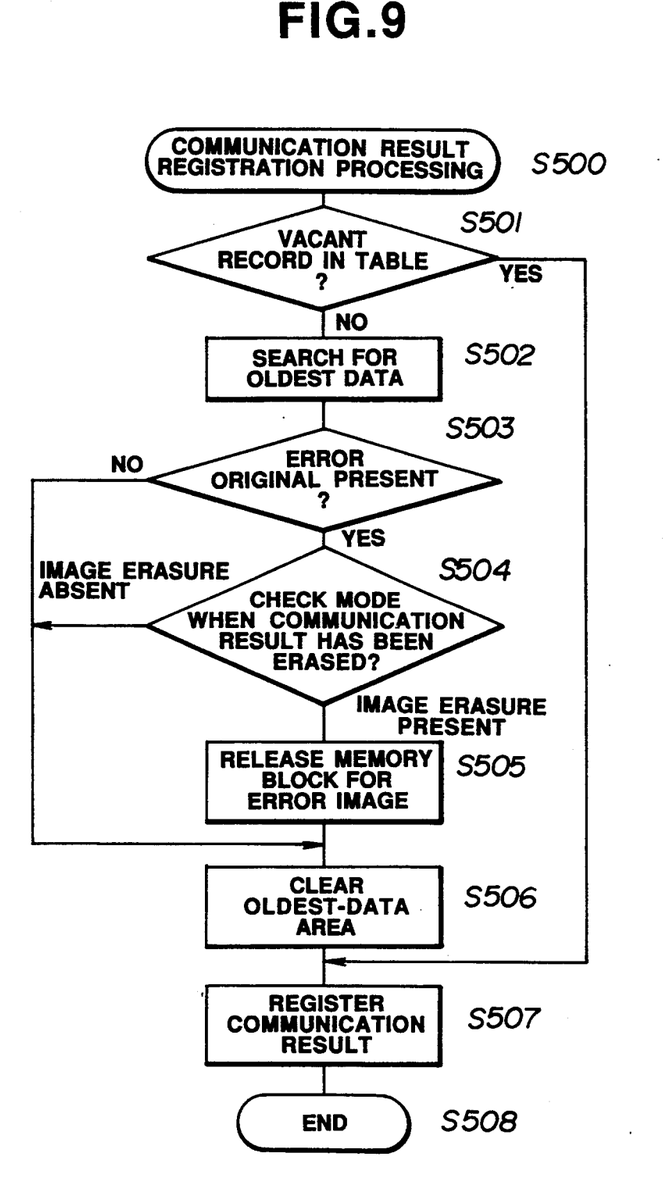
FIG. 9 is a flowchart showing communication result registration processing in the embodiment.

FIG. 9 is a flowchart showing the communication result registration processing in the above-described step S14.

If the communication result registration processing is activated (step S500), the CPU 11 first checks whether or not a vacant record is present in the communication-result table by referring to the used flag in the communication-result table (step S501). If the result of the check is affirmative, the communication result and the error image data are written in the vacant record (step S507), and the processing is terminated (step S508).

If the result of the check in step S501 is negative, the oldest record is searched for from the date-and-time information in the communication-result table (step S502), and the CPU 11 checks whether or not the error image data corresponding to the oldest record is preserved from the error-image item within the record (step S503).

If the error image data corresponding to the oldest record is preserved, the CPU 11 checks the mode of erasure of image when the communication result is erased from the system-switch table (step S504). In erasing the image data, the memory block of the error image data preserved in the data storage memory 16 is released to erase the image data (step S505), the data of the oldest record in the communication-result table is cleared (step S506), a new communication result is written (step S507), and the processing is terminated (step S508).

If the error image data corresponding to the oldest record is not preserved in step S503, the processing after step S506 is performed. Also in the case in which the set value of the system switch is no image erasure in step S504, the processing after step S506 is performed.

Although in the above-described embodiment, in printing an error image, the input password is compared with the password registered in the system-switch table in step S306 shown in FIG. 7, the password may be registered in the communication-result table separately from the error image data, and may be compared with the input password.

While the present invention has been described with respect to what is presently considered to be the preferred embodiment, it is to be understood that the invention is not limited to the disclosed embodiment. The present invention is intended to cover various modifications and equivalent arrangements included within the spirit and scope of the appended claims.

What is claimed is:

1. A facsimile apparatus, comprising:
   data storage means for storing image data;
   transmission means for transmitting the image data stored in said data storage means; and
   control means for determining whether image transmission by said transmission means has ended normally or was interrupted because of an error, determining a cause of the error when the image transmission was interrupted because of the error, and selectively erasing or preserving the image data in said data storage means according to a result of these determinations.

2. A facsimile apparatus according to claim 1, wherein said control means erases the image data when the image transmission has ended normally, and also erases the image data when determines that there is no possibility of success of retransmission according to the cause of the error.

3. A facsimile apparatus according to claim 1, wherein said control means preserves the image data when it determines that there is a possibility of success of retransmission according to the cause of the error.

4. A facsimile apparatus, comprising:
   data storage means for storing image data;
   manual instruction means for instructing storage of the image data in said data storage means;
   transmission means for transmitting the image data stored in said data storage means; and
   control means for determining whether the image transmission by said transmission means has ended normally or was interrupted because of an error, selectively erasing or preserving the image data stored in said data storage means according to a result of the determination, and selectively erasing image data whose image transmission was interrupted because of an error and which was preserved in said data storage means in response to an instruction to store new image data by said manual instruction means.

5. A facsimile apparatus according to claim 4, wherein said data storage means stores a plurality of image data, and further comprising selection means for selecting which image data is to be erased when a plurality of image data whose transmission was interrupted because errors are preserved in said data storage means, and wherein said control means erases the image data selected by said selection means.

6. A facsimile apparatus according to claim 5, wherein said selection means selects either the oldest image data whose transmission was interrupted because of an error, or the image data having the largest amount of data whose transmission was interrupted because of an error to be erased.

7. A facsimile apparatus according to claim 4, further comprising printing means for printing information relating to the image data whose transmission was interrupted because of an error when the image data stored in said data storage means is to be erased.

8. A facsimile apparatus according to claim 4, further comprising printing means for printing the image data whose transmission was interrupted because of an error when the image data stored in said data storage means is to be erased.

9. A fascimile apparatus according to claim 8, further comprising password setting means for setting a password for image data preserved in said data storage means, and password collating means for collating an input password with a set password when a password has been set for image data whose transmission was interrupted because of an error to be printed by said printing means, and wherein the image data whose transmission was interrupted because of an error is printed when the input password and the set password coincide.

10. A facsimile apparatus according to claim 4, wherein said control means determines an amount of image data whicn can be stored in said data storage means in response to the instruction from the manual instruction means to store new image data, and wherein the image data whose transmission was interrupted because of an error is erased if the amount of data which can be stored in said data storage means is smaller than a predetermined amount.

11. A facsimile apparatus according to claim 4, further comprising communication-result storage means for storing communication-result data, and selection means for selecting, in erasing the image data whose transmission was interrupted because of an error, whether communication-result data corresponding to the image data to be erased is to be simultaneously erased, or whether only the image data is to be erased while preserving the communication-result data corresponding to the image data to be erased.

12. A facsimile apparatus, comprising:
    data storage means for storing image data;
    manual instruction means for instructing storage of the image data in said data storage means;
    transmission means for transmitting the image data stored in said data storage means; and
    control means for determining whether image transmission by said transmission means has ended normally or was interrupted because of an error, determining a cause of the error when the image transmission was interrupted because of the error, selectively erasing or preserving image data in said data storage means according to a result of these determinations, and selectively erasing image data whose image transmission was interrupted because of error and which was preserved in said data storage means in response to an instruction to store new image data by said manual instruction means.

13. A facsimile apparatus according to claim 12, wherein said control means erases the image data when the image transmission has ended normally, and also erases the image data when it determines that there is no possibility of success of retransmission according to the cause of the error.

14. A facsimile apparatus according to claim 12, wherein said control means preserves the image data when it determines that there is a possibility of success of retransmission according to the cause of the error.

15. A facsimile apparatus according to claim 12, wherein said control means determines an amount of image data which can be stored in said data storage means in response to the instruction from the manual instruction means to store new image data, and wherein the image data whose transmission was interrupted because of an error is erased if the amount of data which can be stored in said data storage means is smaller than a predetermined amount.

16. A facsimile transmission method for storing image data in data storage means and transmitting the stored image data, said method comprising the steps of:
    determining whether the transmission of the image data stored in data storage means has ended normally, or was interrupted because of an error;
    determining a cause of the error when the transmission was interrupted because of the error; and
    erasing the image data stored in the data storage means when the transmission has ended normally and also when it determines that there is no possibility of retransmission according to the cause of the error, and preserving the image data in the data storage means when it determines that there is a possibility of retransmission according to the cause of the error.

17. A facsimile transmission method for storing image data in data storage means and transmitting the stored image data, said method comprising the steps of:

erasing image data stored in data storage means when transmission of the image data has ended normally, and preserving the image data stored in the data storage means when the transmission of the image data was interrupted because of an error; and selectively erasing image data whose transmission was interrupted because of an error and is stored in the data storage means in accordance with a remaining amount of data which can be stored in the data storage means when storage of new image data in the data storage means has been instructed.

18. A facsimile transmission method according to claim 17, wherein oldest image data whose transmission was interrupted because of an error is erased when erasing image data whose transmission was interrupted because of an error.

19. A facsimile transmission method according to claim 17, wherein image data whose transmission was interrupted because of an error and having the largest amount of data is erased when erasing image data whose transmission was interrupted because of an error.

* * * * *

UNITED STATES PATENT AND TRADEMARK OFFICE
CERTIFICATE OF CORRECTION

PATENT NO. : 5,335,085
DATED : August 2, 1994
INVENTOR(S) : TAKUJI NAKATSUMA

It is certified that error appears in the above-identified patent and that said Letters Patent is hereby corrected as shown below:

IN THE DRAWINGS

Sheet 2 of 8, "DATA" should read --DATE--.

COLUMN 4

Line 59, "out-put" should read --output--.

COLUMN 5

Line 33, "out-put" should read --output--.

COLUMN 7 , claim 2,

Line 10, "when" should read --when it--.

COLUMN 8 , claim 10,

Line 3, "whicn" should read --which--.

Signed and Sealed this

Tenth Day of January, 1995

Attest:

BRUCE LEHMAN

Attesting Officer      Commissioner of Patents and Trademarks